United States Patent
Du et al.

(10) Patent No.: US 10,592,278 B2
(45) Date of Patent: Mar. 17, 2020

(54) DEFER HEAVY OPERATIONS WHILE SCROLLING

(71) Applicant: Facebook, Inc., Menlo Park, CA (US)

(72) Inventors: Qixing Du, Sunnyvale, CA (US); Kang Zhang, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/841,817

(22) Filed: Mar. 15, 2013

(65) Prior Publication Data

US 2014/0282129 A1    Sep. 18, 2014

(51) Int. Cl.
*G06F 3/048* (2013.01)
*G06F 3/0485* (2013.01)
*G06F 9/48* (2006.01)
*G06F 9/50* (2006.01)
*G06Q 50/00* (2012.01)

(52) U.S. Cl.
CPC .......... *G06F 9/4881* (2013.01); *G06F 3/0485* (2013.01); *G06F 9/5027* (2013.01); *G06Q 50/01* (2013.01); *G06F 2209/485* (2013.01); *G06F 2209/5021* (2013.01)

(58) Field of Classification Search
CPC ..... G06Q 50/01; G06F 3/0485; G06F 9/4881; G06F 9/5027
USPC ....................................................... 715/762
See application file for complete search history.

(56) References Cited

U.S. PATENT DOCUMENTS

| | | | |
|---|---|---|---|
| 5,542,088 A * | 7/1996 | Jennings, Jr. ......... | G06F 9/4881 718/103 |
| 6,941,449 B2 | 9/2005 | Ross | |
| 7,426,696 B1 * | 9/2008 | Hwang et al. ................ | 715/784 |
| 7,441,233 B1 | 10/2008 | Orndorff et al. | |
| 7,562,362 B1 | 7/2009 | Paquette et al. | |
| 8,560,635 B1 * | 10/2013 | Sundaram .......... | H04N 21/8456 709/203 |
| 8,766,984 B2 * | 7/2014 | Mark et al. ................... | 345/473 |
| 2011/0246996 A1 | 10/2011 | Tunning | |
| 2011/0296110 A1 | 12/2011 | Lilly | |
| 2012/0011430 A1 * | 1/2012 | Parker .................. | G06F 3/0485 715/234 |

(Continued)

FOREIGN PATENT DOCUMENTS

| | | |
|---|---|---|
| CN | 101828166 A | 9/2010 |
| CN | 102455909 A | 5/2012 |

(Continued)

OTHER PUBLICATIONS

International Search Report and Written Opinion for International Application PCT/US2014/024839, dated Aug. 14, 2014.

(Continued)

*Primary Examiner* — Arpan P. Savla
*Assistant Examiner* — Pritisha N Parbadia
(74) *Attorney, Agent, or Firm* — Jordan IP Law, LLC

(57) ABSTRACT

In one embodiment, a computing device detects an event corresponding to a change in a graphical user interface displayed by the computing device; the computing device identifies at least one operation based on the detected event; the computing device determines a state of the identified operation; the computing device also defers the identified operation based at least in part on the determined state.

12 Claims, 4 Drawing Sheets

(56) References Cited

U.S. PATENT DOCUMENTS

| | | | | |
|---|---|---|---|---|
| 2012/0044251 A1* | 2/2012 | Mark | ............... | G06F 3/0485 345/474 |
| 2012/0194519 A1* | 8/2012 | Bissell | ............... | G06F 16/9577 345/428 |
| 2012/0272181 A1 | 10/2012 | Rogers | | |
| 2013/0031279 A1* | 1/2013 | Venugopal | ............... | H04L 12/1435 710/18 |
| 2013/0198322 A1* | 8/2013 | Oran | ............... | H04L 67/322 709/217 |
| 2014/0189487 A1* | 7/2014 | Kwan | ............... | G06F 17/30905 715/234 |

FOREIGN PATENT DOCUMENTS

| | | |
|---|---|---|
| EP | 0 685 791 A2 | 12/1995 |
| JP | 2001-094658 A | 4/2001 |
| JP | 2008-092302 A | 4/2001 |
| JP | 2012-253712 A | 12/2012 |
| JP | 2013-046357 A | 3/2013 |
| KR | 10-2011-0071097 | 6/2011 |
| WO | 2010/148139 A2 | 12/2010 |

OTHER PUBLICATIONS

European Patent Office, European Search Report for International Application PCT/US2014024839, dated Nov. 23, 2016.

Mexican Institute of Industrial Property, 1st Requirement, Communication of result of substantive examination, for PCT Patent Application MX/a/2015/012643 (with English translation), dated Apr. 26, 2017.

European Patent Office, Communication pursuant to Article 94(3) EPC, for Patent Application No. 14 770 385.4, dated Nov. 23, 2017.

Japan Patent Office, Notification of Reasons for Rejection, for Patent Application No. 2016-501654 (with English translation), dated Dec. 12, 2017.

Mexican Institute of Industrial Property, 2nd Requirement, Communication of result of substantive examination, for PCT Patent Application MX/a/2015/012643 (with English translation), dated Nov. 8, 2017.

Mexican Institute of Industrial Property, 3rd Requirement, Communication of result of substantive examination, for PCT Patent Application MX/a/2015/012643 (with English translation), dated May 18, 2018.

JP OA received from JPO for Patent Application No. 2016-501654. (with English Translation), dated Jul. 24, 2018.

CN Office Action received for Patent Application No. 2014800285521. (with English Translation), dated Dec. 25, 2018.

AU Office Action received for Patent Application No. 2014235402, dated Oct. 12, 2018.

AU Office Action received for Patent Application No. 2014235402, dated Nov. 7, 2018.

AU Office Action received for Patent Application No. 2014235402, dated Sep. 9, 2019.

CN Office Action received for Patent Application No. CN 201480028552. (with English Translation), dated Jul. 15, 2019.

* cited by examiner

DEFER HEAVY OPERATIONS WHILE SCROLLING

TECHNICAL FIELD

This disclosure generally relates to graphical user interface.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

Particular embodiments describe methods for deferring heavy operations during performance critical events, thus providing better user experience. For example, particular embodiments may defer heavy operations during a user scrolling event, thus reducing possible uneven scrolling speed. In particular embodiments, a computing device may detect an event corresponding to a change in a graphical user interface displayed by the computing device. The computing device may identify at least one operation based on the detected event, and determine a state of the identified operation. The computing device may defer the identified operation based at least in part on the determined state.

DESCRIPTION OF EXAMPLE EMBODIMENTS

Figure 1:
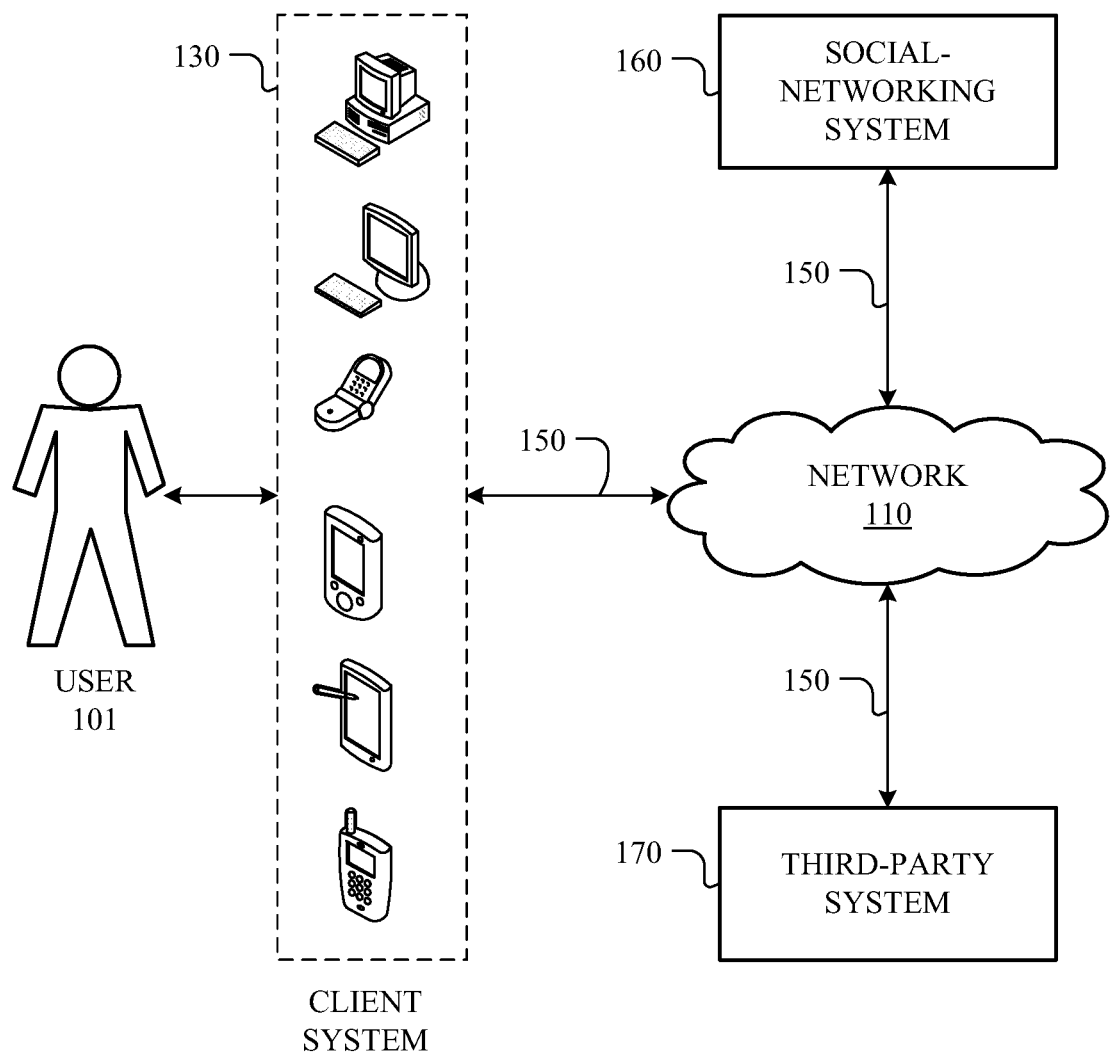
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 170 may be a network-addressable computing system that can host websites or applications. Third-party system 170 may generate, store, receive, and send, such as, for example, web pages, text, images, video, audio, or applications. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
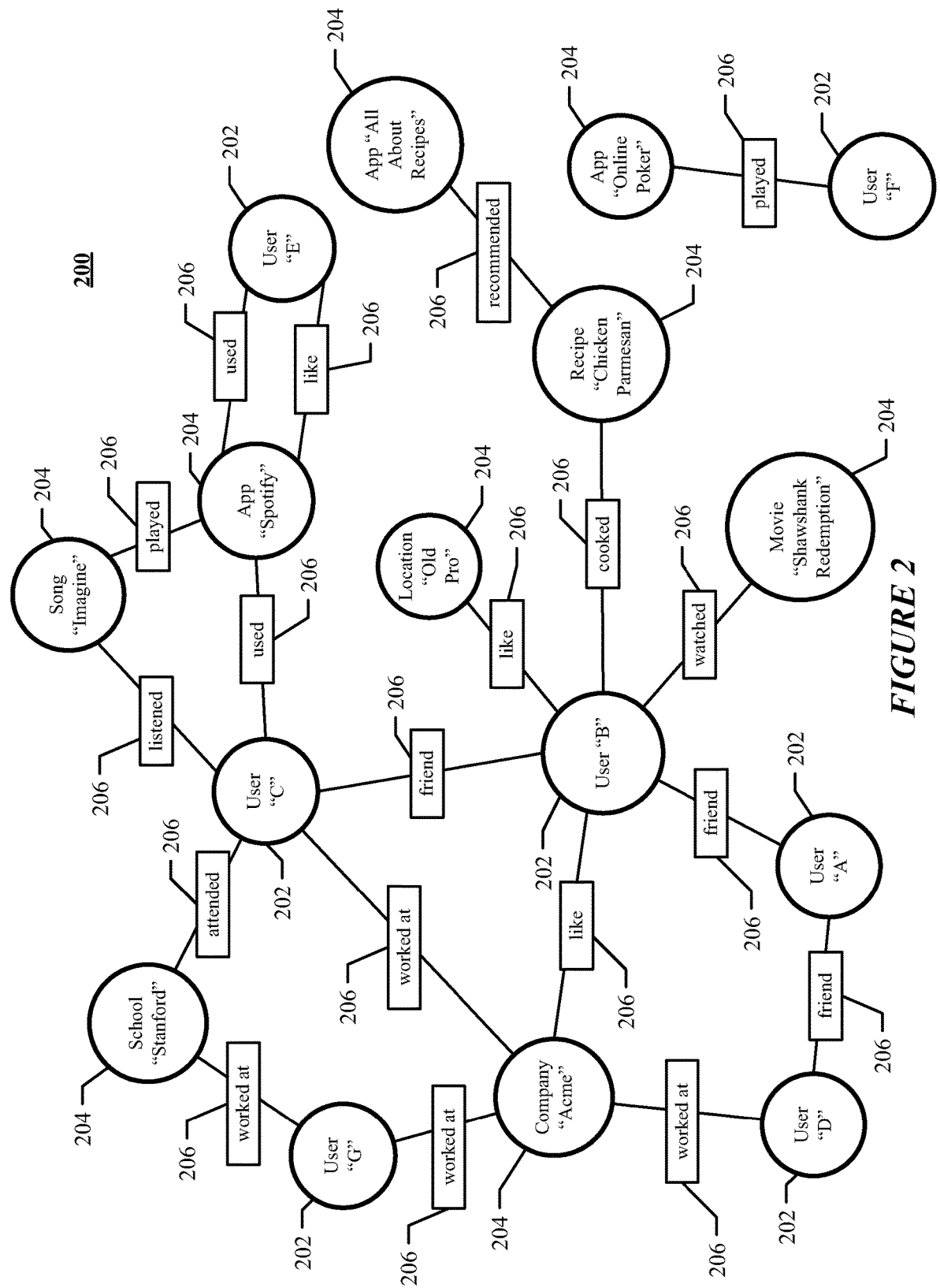
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JAVASCRIPT, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In addition, the degree of separation between any two nodes is defined as the minimum number of hops (or edges) required to traverse the social graph from one node to the other. A degree of separation between two nodes can be considered a measure of relatedness between the users or the concepts represented by the two nodes in the social graph.

The social-networking system may provide to a user frequently update content based on recorded activities or actions that may be related to the user. In particular embodiments, the social-networking system may support a news-feed service. In particular embodiments, a news feed may comprise a data format including one or more news-feed stories. Each news-feed story may include content related to a specific subject matter or topic. In particular embodiments, the social-networking system may aggregate activities or actions related to a specific user action into a news-feed story. For example, a first user may post a photo to the social-networking system, while other users of the social-networking system may perform various activities or actions related to the photo. Other users may "like" the photo, post comments related to the photo, or tag one or more particular users to the photo. The social-networking system may aggregate activities related to the photo into a news-feed story comprising an image of the photo, a profile picture of the first user, a count of "likes" of the photo by other users, and one or more comments related to the photo. As for another example, a first user may checks in to a webpage (maintained by the social-networking system or a third-party system) corresponding to a place (e.g., a landmark, a restaurant, a department store). Other users of the social-networking system may "like" the check-in activity, or post comments related to the check-in activity. The social-networking system may aggregate activities related to the check-in activity into a news-feed story comprising a link and an image of the webpage, a profile picture of the first user, a count of "likes" of the check-in activity by other users, and one or more comments related to the check-in activity. The social-networking system may also aggregate into the news-feed story update to the webpage, or advertising related to the webpage (e.g., on-line coupons from a business related to the webpage). In particular embodiments, the social-networking may present a news feed including one or more news-feed stories to a viewing user. For example, an application (e.g., a web browser) hosted by a client device of the viewing user may retrieve a news feed from the social-networking system and display the news feed in the application's user interface. The application may display each news-feed story in the news feed in a respective frame (e.g., an Hypertext Markup Language or HTML iFrame) in the application's user interface.

The social-networking system may aggregate activities or actions into news-feed stories based on social-graph information. For example, the social-networking system may aggregate for a viewing user a news feed including news-feed stories related to activities or actions performed by users who are within a specified degree of separation (e.g., within two degrees of separation) from the viewing user on the social graph. The social-networking system may aggregate activities or actions into news-feed stories based on privacy settings. For example, a user may specify which other users can access information of a particular activity performed by the user. The social-networking system may aggregate for a viewing user a news feed including news-feed stories related to activities accessible to the viewing user.

A structured document such as a web page may include, for example, page layout information (e.g., frames), scripts, page content such as text (e.g., ASCII or HTML), media data (e.g., images, video clips, or animations), and executable code objects (e.g., a game executable within a browser window or frame). Structured documents may be implemented with languages and technologies such as Hypertext Markup Language (HTML), Extensible Markup Language (XML), Extensible Hypertext Markup Language (XHTML), JAVASCRIPT, WebGL, Cascading Style Sheet (CSS) including CSS animations and transitions, and, frequently, Java. A structured document may itself include references to multiple structured documents and contents. For example, a web page may include one or more inline references by incorporating Uniform Resource Locations (URL's) or script code (e.g., JAVASCRIPT, PHP, or AJAX) that in response to a user event (e.g., a mouse click, a mouse hover-over), causes an application displaying the web page in a graphical user interface to dynamically retrieve content specified by an URL and the script code.

An application displaying a structured document in a graphical user interface may retrieve content specified by the structured document (or by a user of the application) by submitting a database query to a remote database (e.g., hosted by a website) through an application programming interface (API). A query result returned from the remote database may comprise codes expressed in JAVASCRIPT Object Notation (JSON) format. The application may parse the JSON codes before displaying the result in the graphical user interface. The application may also retrieve content specified by the structured document (or by a user of the application) by accessing one or more local files for cached content.

When a user views or interacts with a structured document in a graphical user interface of an application (e.g., a web browser), the application may retrieve and render content of the structured document displayed within the graphical user interface. The application may retrieve and render additional content of the structured document as the user scrolls up or down the structured document in the graphical user interface. Operations related to retrieving and rendering content of the structured document may include database query, JSON parsing, or file access (or data serialization or de-serialization) as described above. Operations related to retrieving and rendering content of the structured document may include photograph decoding (e.g., Joint Photographic Experts Group or JPEG image decoding) for images in the structured document. However, operations related to retrieving and rendering content of the structured document may effect performance of the application with limited hardware resource, and decrease user engagement and quality of the application.

For example, a database query being submitted to a remote database by an application may cause pauses to the application if the remote database is not responsive. For example, decoding of a large photograph may require higher processing or memory resources thus impeding execution of the application. For example, JSON parsing, database query, data serialization or de-serialization, and photograph decoding may require higher memory and trigger automatic memory management activities (e.g., garbage collection in Java programming language) by the computing device hosting the application. Automatic memory management activities may consume significant amount of processing resources and cause pauses in code execution associated with the application (e.g., execution of Java Virtual Machine). Moreover, automatic memory management activities can cause untimely pauses to the application as the automatic memory management activities are controlled by the computing device hosting the application, not by the application. During performance critical events such as scrolling or animation, those "heavy" operations may deteriorate visual experience of the application such as choppy scrolling, frozen screen, or dropped frames. Meanwhile, operations such as JSON parsing, database query, file access, or photograph decoding originated from another application different from the application displaying the graphical user interface may also deteriorate visual experience of the graphical user interface.

Particular embodiments describe methods for preserving visual experience of a graphical user interface of an application. Particular embodiments preserve visual experience of the graphical user interface by deferring heavy operations during performance critical events such as scrolling and animation.

Figure 3:
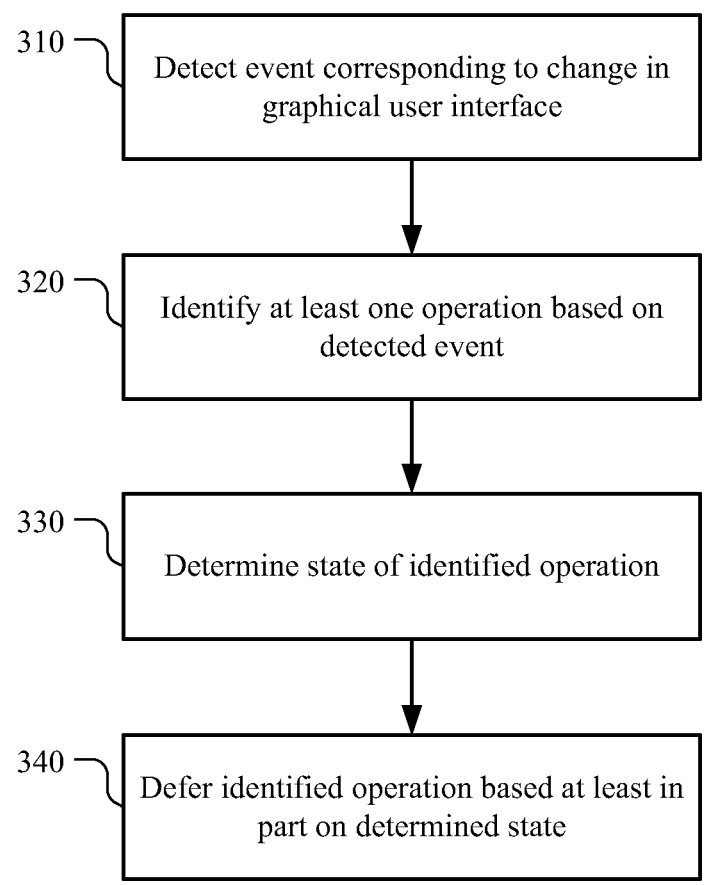
FIG. 3 illustrates an example method for deferring heavy operations during performance critical events.

FIG. 3 illustrates an example method 300 for deferring heavy operations during performance critical events. The method 300 may be implemented by a computing device. For example, the method 300 may be implemented by one or more computing processes executing on one or more processors of the computing device. The computing device may be a desktop computer, a laptop computer, a tablet computer, a smartphone, or any suitable computing device with at least a display displaying one or more graphical user interfaces. The method 300 may begin at step 310. In particular embodiments, at step 310, the computing device may detect an event corresponding to a change in a graphical user interface displayed by the computing device.

The change in the graphical user interface may correspond to a performance critical event that may be affected by one or more heavy operations as described earlier. For example, the graphical user interface may display a scrollable list of content objects (e.g., text, images, HTML iFrames, and so on). For another example, the graphical user interface may display a news feed comprising a scrollable list of news-feed stories (e.g., each news-feed story is contained in an HTML iFrame). The change in the graphical user interface may correspond to a scrolling event initiated by a user of the computing device. The user may scroll up or down the graphical user interface by using a sliding gesture on a touch screen displaying the graphical user interface, or by using a mouse or pointing device to drag up or down a scrolling bar of the graphical user interface. The scrolling event may be along a vertical axis of the graphical user interface, along a horizontal axis of the graphical user interface, or along any suitable direction. The change in the graphical user interface may also correspond to a fling event associated with the scrollable list displayed by the graphical user interface. A user may use a flick touch gesture to scroll up or down (or in any suitable direction) the scrollable list such that the list moves ("flies") in the graphical user interface at a velocity of the flick touch gesture, and may gradually slow down to a stop.

The change in the graphical user interface may correspond to an animation event displayed in the graphical user interface. An animation event may comprise an animation effect encompassing all or a portion of a display area of the graphical user interface. An animation event may comprise an animation effect within a frame displayed in the graphical user interface.

The change in the graphical user interface may correspond to a custom event that is defined by a user of the computing device, or a programmer of a program or operating system running on the computing device. A programmer of a program may define a custom event as corresponding to a change exceeding a pre-determined threshold. For example, the programmer may define a custom event (during the execution of the program) if the custom event corresponds to a change in the graphical user interface that the change exceeds 20 percent of the display area of the graphical user interface. For another example, the programmer may define a custom event if it corresponds to displaying a new frame in the graphical user interface and the new frame's area exceeds 20 percent of the graphical user interface's display area. For yet another example, the programmer may define a custom event if it corresponds to a new animation in the graphical user interface and the animation's area exceeds 20 percent of the graphical user interface's display area. In one embodiment, the computing device (e.g., an operating system running on the computing device) may detect an event corresponding to a change in the graphical user interface in that the change exceeds a pre-determined threshold (e.g., the change exceeds 30 percent of the graphical user interface's display area).

The computing device may detect an event corresponding to a change in a graphical user interface displayed by the computing device by using listener or event messaging. For example, a detector process running on the computing device may register with an application (or an operating system) displaying the graphical user interface (e.g., using a handler function) as a listener to scrolling events associated with the graphical user interface. The detector process may detect a scrolling event through the listener function. The detector process may also register as a listener to animation events associated with the graphical user interface. The detector process may detect, through the listener function, a start of an animation event or a stop of an animation event. The detector process may also register as a listener to a custom event to detect a start and an end of the custom event. For example, the detector process may detect, through the listener function, a state being before the start of the custom event, a state during the process of the custom event, and a state being after the end of the custom event.

In particular embodiments, at step 320, the computing device may identify at least one operation based on the detected event. An operation identified by the computing device may be a heavy operation that may effect visual experience during the detected event. For example, an operation identified by the computing device may comprise JSON parsing, database query, data serialization or de-serialization, or photograph decoding described earlier. Particular embodiments contemplate any suitable operations that may effect visual experience during the detected event. For example, an operation identified by the computing device may cause a significant decrease (e.g., greater than 35 percent) in a frame rate associated with the graphical user interface. For another example, an operation identified by the computing device may pause the execution of the application displaying the graphical user interface for a period of time longer than a period of one frame (e.g., greater than 17 milliseconds for a frame rate of 60 Hz). That is, the operation may cause the graphical user interface to drop one or more frames.

The computing device may identify at least one operation by using listener or evening messaging. For example, the detector process may publish detected events such as a scrolling event, a start of an animation event, or an end of an animation event described earlier. Meanwhile, an operation (e.g., JSON parsing, database query, and so on) may subscribe to the detector process. As a subscriber to events published by the detector process, the operation may be notified by the detector process about the detected event. That is, the computing device may identify at least one operations that, as a subscriber to the detector process, is notified by the detector process about the detected event. Here, the identified process (the subscriber) may be of a different computing thread (or process) executed by the computing device from the detector process and from the graphical user interface. Thus the computing device may defer or suspend the identified operation without impacting the execution of the detector process or the graphical user interface.

In particular embodiments, at step 330, the computing device may determine a state of the identified operation. The computing device may determine whether the identified operation is idle. For example, a database query operation may be idle whiling waiting for a response from a remote database. The computing device may determine whether the identified operation is at an initial stage of processing (e.g., just receiving input data), whether the identified operation is already processing data, or whether the identified operation is almost finishing processing data. For example, a file access operation may just receive an instruction for accessing a particular file. Or the file access operation may be retrieving data from the particular file. Or the file access operation may have retrieved data from the particular file and may be just about to return the retrieve data.

In particular embodiments, at step 340, the computing device may defer the identified operation based at least in part on the determined state. For example, the computing device may defer the identified operation if the identified operation is idle. The computing device may defer the identified operation if the identified operation is at its initial stage of processing data. The computing device may not defer the identified operation if the identified operation is already processing data or is almost finishing processing data. The computing device may defer the identified operation if the identified operation is already processing data.

In particular embodiments, the computing device may resume the identified operation after an end of the detected event. For example, an operation, as a subscriber to the detector process, may suspend its execution after receiving a start of an animation event published by the detector process. The operation may resume its execution after receiving an end of the animation event published by the detector process.

In other embodiments, the computing device may resume the deferred operation after a pre-determined period of time. That is, the computing device may time out the deferring of the identified operation such that, for example, the deferring may not incidentally block execution of another computing process (running on the computing device) that is waiting for results from the deferred operation.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
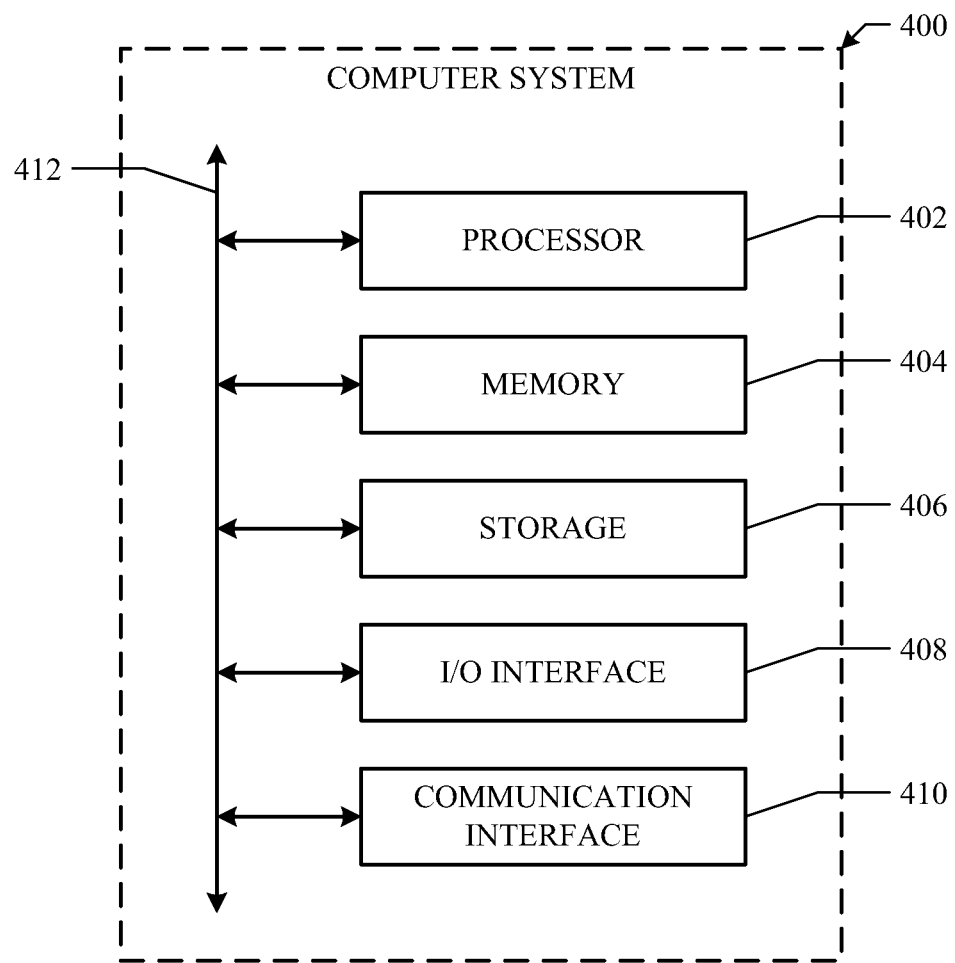
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, detecting a scroll event corresponding to a change in a graphical user interface displayed, using a first computing process, by the computing device;
   by the computing device, identifying, for delayed execution, an operation associated with a second computing process, different from the first computing process, that, if not delayed, would cause the graphical user interface to drop one or more frames, based on the detected event, wherein the identified operation is related to retrieving and rendering content of a structured document used in displaying a webpage in the graphical user interface;
   by the computing device, determining a state of the identified operation, the determined state identifying a relative progress of the identified operation with respect to completing an associated task that is currently executing, wherein the relative progress indicates whether the identified operation is (1) idle, (2) at an initial stage of processing data, or (3) almost finished processing data;
   by the computing device, determining whether to defer the identified operation for a deferral period based on the determined state and whether the identified operation is likely to trigger an automatic memory management activity controlled by the computing device and not controlled by an application displaying the graphical user interface; and
   by the computing device, resuming execution of the identified operation after the deferral period.

2. The method of claim 1, further comprising, by the computing device:
   pausing execution of the identified operation during the deferral period.

3. The method of claim 1, wherein the change exceeds a pre-determined threshold.

4. The method of claim 1, wherein the identified operation comprises JavaScript Object Notation (JSON) parsing, database query, data serialization or de-serialization, or photograph decoding.

5. A system comprising:
   one or more processors; and
   a memory coupled to the processors comprising instructions executable by the processors, the processors being operable when executing the instructions to:
      detect a scroll event corresponding to a change in a graphical user interface displayed, using a first computing process, by the computing device;
      identify, for delayed execution, an operation associated with a second computing process, different from the first computing process, that, if not delayed, would cause the graphical user interface to drop one or more frames, based on the detected event, wherein the identified operation is related to retrieving and rendering content of a structured document used in displaying a webpage in the graphical user interface;
      determine a state of the identified operation, the determined state identifying a relative progress of the identified operation with respect to completing an associated task that is currently executing, wherein the relative progress indicates whether the identified operation is (1) idle, (2) at an initial stage of processing data, or (3) almost finished processing data;
      determine whether to defer the identified operation for a deferral period based on the determined state and whether the identified operation is likely to trigger an automatic memory management activity controlled by the computing device and not controlled by an application displaying the graphical user interface; and
      resume execution of the identified operation after the deferral period.

6. The system of claim 5, wherein the processor is further operable to:
   pause execution of the identified operation during the deferral period.

7. The system of claim 5, wherein the change exceeds a pre-determined threshold.

8. The system of claim 5, wherein the identified operation comprises JavaScript Object Notation (JSON) parsing, database query, data serialization or de-serialization, or photograph decoding.

9. One or more computer-readable non-transitory storage media embodying software that is operable when executed to:

detect a scroll event corresponding to a change in a graphical user interface displayed, using a first computing process, by the computing device;

identify, for delayed execution, an operation associated with a second computing process, different from the first computing process, that, if not delayed, would cause the graphical user interface to drop one or more frames, based on the detected event, wherein the identified operation is related to retrieving and rendering content of a structured document used in displaying a webpage in the graphical user interface;

determine a state of the identified operation, the determined state identifying a relative progress of the identified operation with respect to completing an associated task that is currently executing, wherein the relative progress indicates whether the identified operation is (1) idle, (2) at an initial stage of processing data, or (3) almost finished processing data;

determine whether to defer the identified operation for a deferral period based on the determined state and whether the identified operation is likely to trigger an automatic memory management activity controlled by the computing device and not controlled by an application displaying the graphical user interface; and resuming execution of the identified operation after the deferral period.

10. The one or more computer-readable non-transitory storage media of claim 9, wherein the software is further operable when executed to:

pause execution of the identified operation during the deferral period.

11. The one or more computer-readable non-transitory storage media of claim 9, wherein the change exceeds a pre-determined threshold.

12. The one or more computer-readable non-transitory storage media of claim 9, wherein the identified operation comprises JavaScript Object Notation (JSON) parsing, database query, data serialization or de-serialization, or photograph decoding.

* * * * *